United States Patent
Yang et al.

(10) Patent No.: US 7,652,989 B2
(45) Date of Patent: Jan. 26, 2010

(54) METHOD OF PERFORMING ADAPTIVE CONNECTION ADMISSION CONTROL IN CONSIDERATION OF INPUT CALL STATES IN DIFFERENTIATED SERVICE NETWORK

(75) Inventors: Mi Jung Yang, Daejeon (KR); Woo Seop Rhee, Daejeon (KR); Jin Ho Hahm, Daejeon (KR); Young Sun Kim, Daejeon (KR); Jun Hwa Lee, Daejeon (KR); Sang Ha Kim, Daejeon (KR)

(73) Assignee: Electronics & Telecommunications Research Institute, Daejeon (KR)

(*) Notice: Subject to any disclaimer, the term of this patent is extended or adjusted under 35 U.S.C. 154(b) by 787 days.

(21) Appl. No.: 10/826,179

(22) Filed: Apr. 16, 2004

(65) Prior Publication Data
US 2005/0083842 A1 Apr. 21, 2005

(30) Foreign Application Priority Data
Oct. 17, 2003 (KR) .................. 10-2003-0072482

(51) Int. Cl.
H04L 12/28 (2006.01)
(52) U.S. Cl. .................... 370/230; 370/395.21; 370/468
(58) Field of Classification Search ............. 370/395.2, 370/231, 431, 389; 709/226
See application file for complete search history.

(56) References Cited

U.S. PATENT DOCUMENTS 6,487,170 B1* 11/2002 Chen et al. ............... 370/231
7,190,698 B2* 3/2007 Svanberg et al. ......... 370/395.2
2001/0055314 A1* 12/2001 Suzuki et al. ............. 370/468
2003/0028641 A1* 2/2003 Zhang et al. .............. 709/226
2004/0028054 A1* 2/2004 Khurana et al. ........ 370/395.21
2004/0136379 A1* 7/2004 Liao et al. ............. 370/395.21

FOREIGN PATENT DOCUMENTS

WO WO 00/30295 5/2000

OTHER PUBLICATIONS

IEICE Trans. Commun., vol. E8-B, No. 8, Aug. 2001, pp. 2011-2025.

* cited by examiner

*Primary Examiner*—Chirag G Shah
*Assistant Examiner*—Nima Mahmoudzadeh
(74) *Attorney, Agent, or Firm*—Blakely, Sokoloff, Taylor & Zafman LLP

(57) ABSTRACT

In the adaptive connection admission control method of the present invention, a corresponding ingress edge node performs connection admission control for a new connection within the amount of bandwidth initially allocated to each of paths between the ingress and egress edge nodes. The amount of remaining bandwidth allocated to a specific path Pr is compared with an amount of bandwidth required for a call requesting new connection setup input to the corresponding ingress edge node. The amount of additional bandwidth to be requested from the bandwidth broker is predicted when the amount of the remaining bandwidth does not satisfy the amount of bandwidth required for the connection setup requesting call. The ingress edge node requests additional bandwidth from the bandwidth broker on the basis of the predicted amount of the additional bandwidth, changing bandwidth information of the corresponding path Pr, and performing connection admission control.

7 Claims, 5 Drawing Sheets

METHOD OF PERFORMING ADAPTIVE CONNECTION ADMISSION CONTROL IN CONSIDERATION OF INPUT CALL STATES IN DIFFERENTIATED SERVICE NETWORK

BACKGROUND OF THE INVENTION

1. Field of the Invention

The present invention relates, in general, to a method of performing connection admission control in a differentiated services network and, more particularly, to a method of performing adaptive connection admission control in consideration of the states of input calls in the differentiated services network, which, when an ingress edge node exhausts bandwidth allocated thereto, allows the ingress edge node to predict the amount of additional bandwidth required in consideration of the states of calls input to a corresponding path, to request the amount of additional bandwidth from a bandwidth broker, and to perform connection admission control using the bandwidth additionally allocated to the corresponding path in the differentiated services network.

2. Description of the Prior Art

Recently, the Internet is trending toward wide bandwidth due to the development of transmission technology, such as xDSL (Digital Subscriber Line) and Metro Ethernet. Further, with the development of various Internet multimedia contents, new application services requiring Quality of Service (QoS) guarantee, such as Internet broadcasting, Voice over Internet Protocol (VoIP) and Virtual Private Network (VPN), have appeared. Therefore, Internet service users require differentiated services so as to be provided with high quality guaranteed services. Accordingly, technology related to QoS guarantee in the Internet has been introduced as an important research subject. As a result, the QoS guaranteeing technology capable of not only ensuring bandwidth but also satisfying transmission reliability, real-time service, etc. should be proposed so as to deviate from best effort services and support service applications having various requirements in the Internet.

For the QoS guaranteeing technology in the Internet, various functions, such as connection admission control, congestion control, traffic shaping, metering, marking and scheduling, have been proposed. Of the functions, the connection admission control has been primarily required. The object of the connection admission control is to allocate network resources so that a network provides reliable paths capable of guaranteeing a packet loss probability or delay requirement requested by a user.

Of connection admission control schemes, parameter-based admission control mainly used in a telephone network or packet network is disadvantageous in that, since all nodes on a path must manage the parameters and states of connections required to be established by respective ingress edge nodes in the network, serious problems may occur in terms of scalability or complexity in Internet core networks becoming large-sized if the parameter-based admission control scheme is applied to the Internet. Further, measurement-based admission control is problematic in that input traffic should be predicted on the basis of the steady-state average arrival rate at the time of traffic prediction, but there is a high probability that inaccurate connection admission control may be performed.

Further, a static provisioning scheme using a bandwidth broker is disadvantageous in that it is impossible to adapt to network conditions, such as dynamically varying Internet traffic or routing, and the change of the allocation of network resources is performed in certain periods, so that the network resources cannot be efficiently used, and the variously changing states of the network cannot be taken into consideration, thus decreasing the efficiency of resource utilization. A dynamic provisioning scheme being researched to solve the disadvantages is advantageous in that it can dynamically take the states of the network into consideration. However, it is disadvantageous in that a bandwidth broker should be informed of even link-level bandwidths within the network from all nodes and manage the bandwidths, and communications between the respective nodes and the bandwidth broker are frequently performed, so that scalability cannot be provided and then complexity is increased.

Further, a connection admission control scheme using a bandwidth broker is problematic in that the bandwidth broker must perform connection admission control on all connection requests, so that responses to the connection admission are not immediately made and the load of connection admission control is concentrated on the bandwidth broker.

In the meantime, a connection admission control scheme for guaranteeing QoS in the Internet is disclosed in PCT Application No. WO 00/30295 entitled "Providing admission control and network quality of service with a distributed bandwidth broker". In the scheme of the above patent, respective nodes within a network perform connection admission control using a control message so as to avoid the complexity of the bandwidth broker. Further, a method of initially allocating bandwidth to each path in quotas to perform connection admission control, examining whether quotas can be allocated to all links on the path when the allocated quota is exhausted, and then allocating new quotas to perform connection admission control is disclosed in a reference thesis entitled "On scalable design of bandwidth broker" by Zhi-Li Zhang in IEICE Trans. Commun., Vol. E84-B, No. 8, pp. 2011 - 2025, 2001. 8. However, the conventional method disclosed in the thesis is disadvantageous in that the size of a quota must be determined and the bandwidths of all links on the path must be examined so as to allocate new quotas when the quota allocated to the path is exhausted.

SUMMARY OF THE INVENTION

The present invention provides a method of performing adaptive connection admission control in consideration of the states of input calls in a differentiated services network, which, when an ingress edge node exhausts bandwidth allocated thereto, allows the ingress edge node to perform connection admission control within a range of bandwidth for each path allocated from a bandwidth broker, to predict the amount of additional bandwidth required in consideration of the states of calls input to a corresponding path, to request the amount of additional bandwidth from the bandwidth broker, and to perform connection admission control using the bandwidth additionally allocated to the corresponding path in the differentiated services network.

Another object of the present invention is to provide a method of performing adaptive connection admission control in consideration of the states of input calls in a differentiated services network, which decreases the amount of additionally allocated bandwidth and returns the decreased amount of the additionally allocated bandwidth to the bandwidth broker when the bandwidth additionally allocated through the above prediction is not exhausted within a certain range, thus enabling resources to be efficiently used.

In order to accomplish the above objects, the present invention provides a method of performing adaptive connection admission control in consideration of states of input calls in a Differentiated Services (DiffServ) network, the DiffServ network including a bandwidth broker, a plurality of ingress and egress edge nodes and a plurality of core nodes, the method comprising the steps of a) a corresponding ingress edge node performing connection admission control for a new connection within an amount of bandwidth initially allocated to each of paths between the ingress and egress edge nodes; b) comparing an amount of remaining bandwidth allocated to a specific path Pr with an amount of bandwidth required for a call requesting new connection setup input to the corresponding ingress edge node, and predicting an amount of additional bandwidth to be requested from the bandwidth broker when the amount of the remaining bandwidth does not satisfy the amount of the bandwidth required for the connection setup requesting call; and c) requesting additional bandwidth from the bandwidth broker on the basis of the predicted amount of the additional bandwidth, changing bandwidth information of the corresponding path Pr and performing connection admission control.

Preferably, the adaptive connection admission control method may further comprise the step of d) decreasing the amount of additionally allocated bandwidth when the amount of the additionally allocated bandwidth is not exhausted within a certain range, and returning the decreased amount of the additionally allocated bandwidth to the bandwidth broker.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
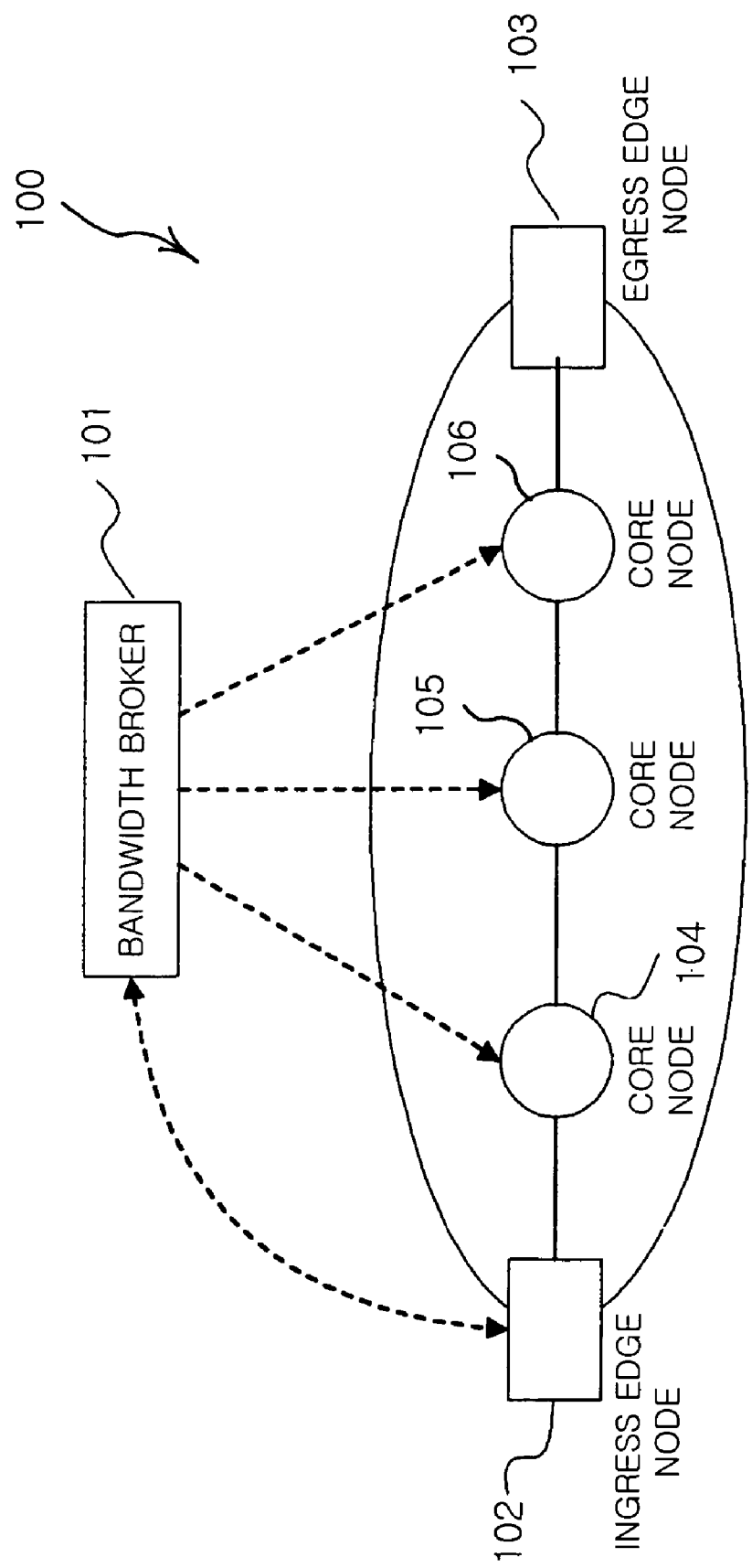
FIG. 1 is a view showing the construction of a differentiated services network to which the present invention is applied.

Hereinafter, embodiments of the present invention will be described in detail with reference to the attached drawings.

Reference now should be made to the drawings, in which the same reference numerals are used throughout the different drawings to designate the same or similar components.

FIG. 1 is a view showing the construction of a Differentiated Services (DiffServ) network to which the present invention is applied. Referring to FIG. 1, the DiffServ network 100 to which the present invention is applied includes an ingress edge node 102 and an egress edge node 103 located at the edges of the network 100, a core node 104 located in the network 100, and a bandwidth broker 101 for managing bandwidth resources among the nodes 102 to 104. Although one ingress edge node 102 and one egress edge node 103 are shown in FIG. 1, a plurality of ingress and egress edge nodes can be provided in another embodiment. Furthermore, one or more core nodes 104 to 106 can be provided in the DiffServ network 100. The bandwidth broker 101 allocates initial bandwidths to paths between all edge nodes 102 and 103 within the network, determined using a routing protocol, and reports the allocation of initial bandwidths to the ingress edge node 102. Further, when the ingress edge node 102 requests the allocation of additional bandwidth, the bandwidth broker 101 allocates additional bandwidth depending on the states of resources in a corresponding path, and withdraws and manages unused resources of the additionally allocated bandwidth.

The ingress edge node 102 performs connection admission control with respect to each of input calls within the bandwidth allocated from the bandwidth broker 101. Further, if the allocated bandwidth is exhausted, the ingress edge node 102 predicts additional bandwidth in consideration of the states of calls having been input, and requests the bandwidth broker 101 to allocate the predicted additional bandwidth. If the additionally allocated bandwidth is not exhausted within a certain range, the ingress edge node 102 allows another path to use the allocated bandwidth. The variations in resources due to the allocation and return of bandwidth are reported to the nodes 104 to 106 within the network by the bandwidth broker 101.

Figure 2:
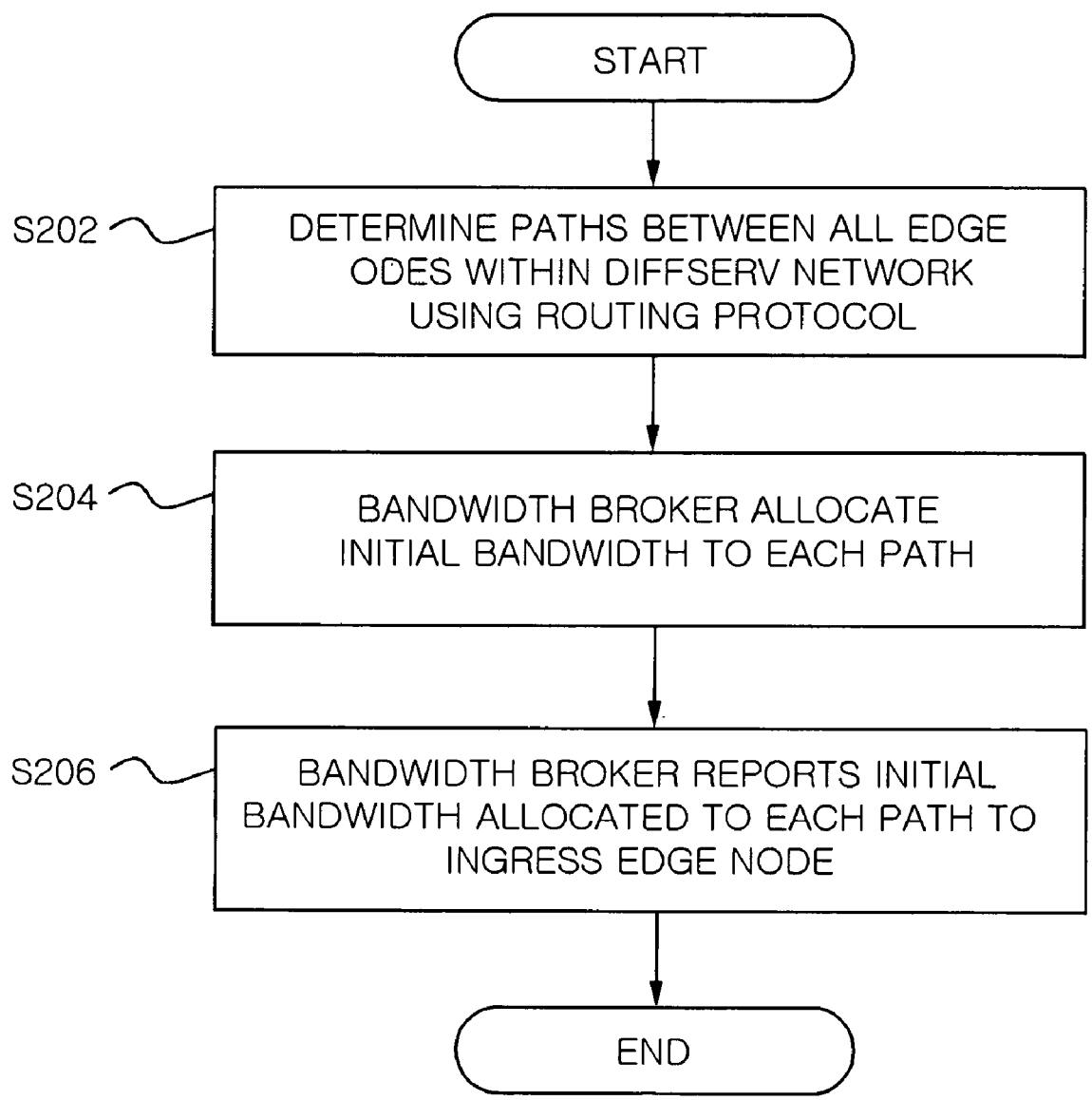
FIG. 2 is a flowchart of a process of allocating initial bandwidth to each path by a bandwidth broker according to the present invention.

FIG. 2 is a flowchart of a process of allocating initial bandwidth to each path by the bandwidth broker according to the present invention. Referring to FIG. 2, paths between all edge nodes 102 and 103 within the DiffServ network 100 are determined using a routing protocol at step S202. That is, the paths between all edge nodes 102 and 103 are determined, and a path corresponding to a destination address of an input call arrived at the ingress edge node 102 is determined. Further, connection admission control is performed on the basis of the remaining portion of the bandwidth allocated to the corresponding path. Thereafter, the amount of initial bandwidth allocated to each path is determined by the bandwidth broker 101 at step S204. The determined amount of the initial bandwidth for each path is reported to the ingress edge node 102 at step S206.

Figure 3:
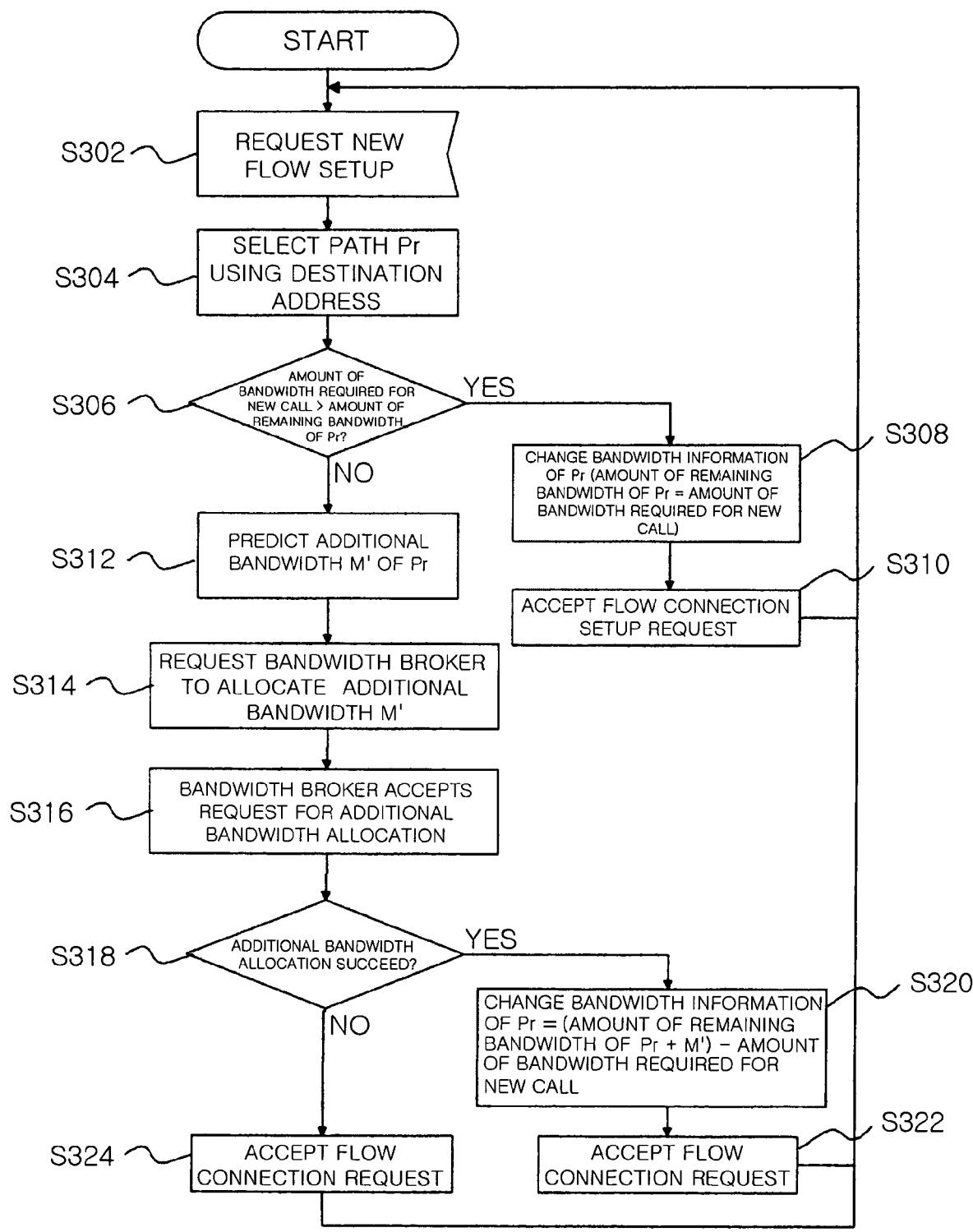
FIG. 3 is a flowchart of a process of controlling a connection admission by an ingress edge node according to the present invention.

FIG. 3 is a flowchart of a process of controlling a connection admission by the ingress edge node according to the present invention. Referring to FIG. 3, when a call requesting the connection setup of a new flow is input to the ingress edge node 102 at step S302, a path is selected using a destination address of the call at step S304. If the amount of the remaining bandwidth, which is allocated to the selected path (hereinafter the selected path is referred to as Pr) and is currently available, is compared to the amount of bandwidth required for the connection setup requesting call at step S306. If the amount of the remaining bandwidth of Pr is greater than the amount of bandwidth required for the connection setup requesting call at step S306, that is, if the amount of the remaining bandwidth of the Pr is large enough to accommodate a new call, the ingress edge node 102 changes bandwidth information of the Pr as expressed in Equation [1], and accepts the connection setup request for the new flow at step S310.

changed bandwidth information of $Pr$=amount of remaining bandwidth of $Pr$−amount of bandwidth required for new call [1]

In the meantime, if the amount of bandwidth required for the connection setup requesting call is greater than the amount of the remaining bandwidth of the Pr at step S306, that 10 is, if the amount of the remaining bandwidth of the Pr cannot accommodate a new call, the ingress edge node 102 predicts and calculates the amount of additional bandwidth M' of the Pr to be requested from the bandwidth broker 101 as expressed in Equation [2] at step S312, $$M' = BW_{(i+1)} = \frac{UBW_i - UBW_{i-1}}{T_i - T_{i-1}} \Delta t \qquad [2]$$

$$\Delta t = \frac{\sum_{k=0}^{i} T_k - T_{k-1}}{i-1}$$

where $T_i$: the time when the i-th allocation of additional bandwidth is requested $BW_i$: the amount of bandwidth allocated at time $T_i$ $UBW_i$: the amount of actually used bandwidth of the amount of bandwidth allocated at time Ti $\Delta t$: average of time intervals at which the allocation of the additional bandwidth is requested from the bandwidth broker 101.

In this case, as described above, when the ingress edge node 102 requests the amount of the additional bandwidth from the bandwidth broker 101 with respect to the path Pr having the amount of initially allocated bandwidth incapable of accommodating a new call, the ingress edge node 102 can control a connection admission while reducing communications with the bandwidth broker 101 if it is allocated a larger amount of bandwidth. However, at this time, other paths may not be allocated bandwidths, thus increasing a call blocking probability. In the meantime, if the ingress edge node 102 is allocated a minimum amount of bandwidth to such an extent to barely accommodate a new call, complexity is increased due to the frequent communications with the bandwidth broker 101. Therefore, the ingress edge node 102 calculates a suitable bandwidth as expressed in Equation [2] in consideration of the states of calls having been input, thus minimizing the communication with the bandwidth broker 101 while minimizing the call blocking probability.

Referring to FIG. 3 again, the ingress edge node 102 requests the bandwidth broker 101 to allocate the additional bandwidth, which has been predicted and calculated above, at step S314. The bandwidth broker 101 having received the request for the allocation of the additional bandwidth accepts the request for the additional bandwidth depending on the states of all links through which the corresponding path Pr passes at step S316. Thereafter, the ingress edge node 102 receives a response to the request for the allocation of the additional bandwidth from the bandwidth broker 101, and then determines whether the allocation of the additional bandwidth succeeds at step S318. If the allocation of the additional bandwidth succeeds at step S318, the ingress edge node 102 changes the bandwidth information of the path Pr as expressed in Equation [3] at step S320 and accepts the connection setup request for the new flow at step S322. In contrast, if the allocation of the additional bandwidth fails at step S318, the ingress edge node 102 rejects the connection setup request for the new flow at step S324.

changed bandwidth information of $Pr$=(amount of remaining bandwidth of $Pr=M'$) −amount of bandwidth required for new call    [3]

Figure 4:
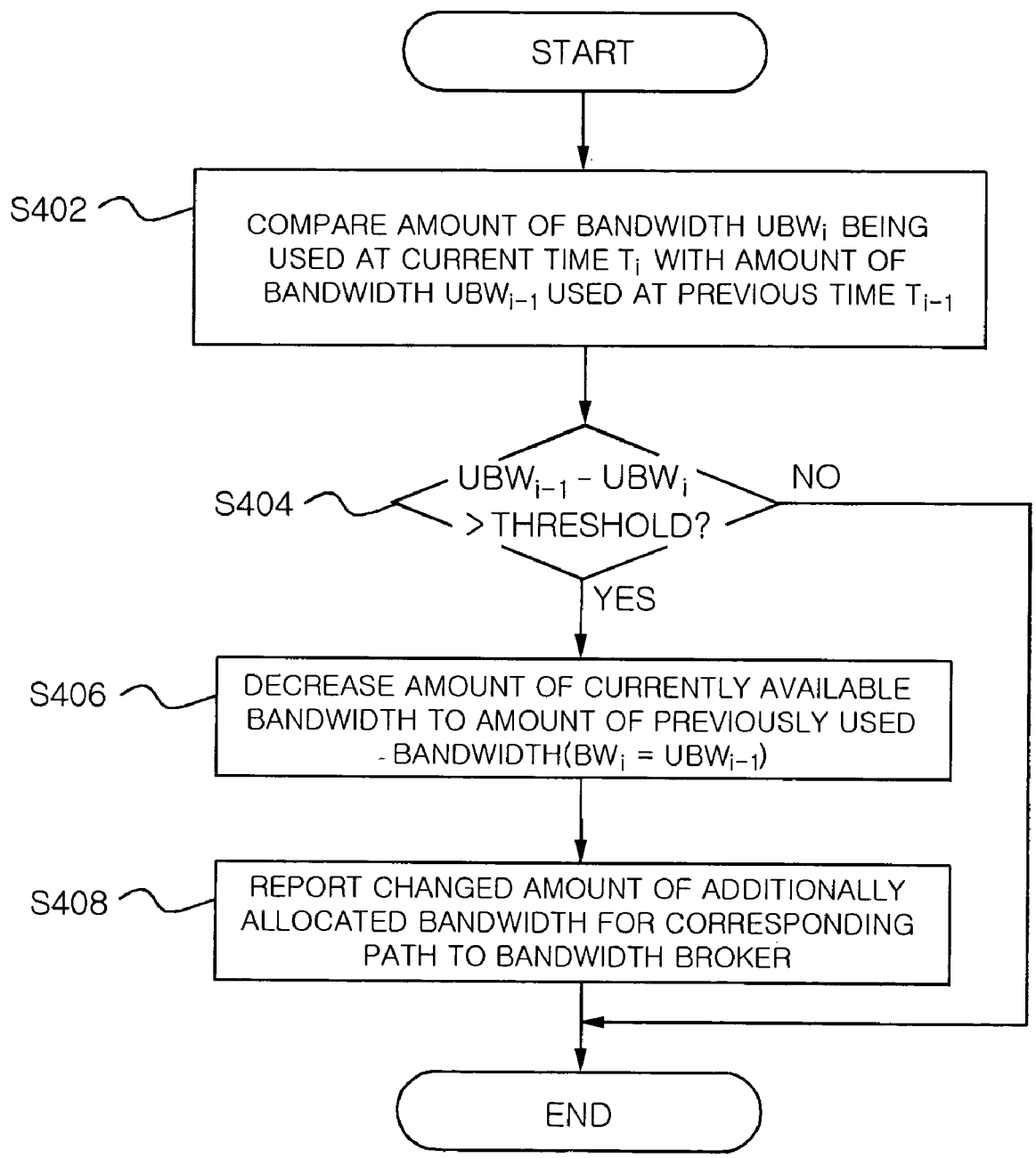
FIG. 4 is a flowchart of a process of decreasing bandwidth allocated to each path according to the present invention.
Figure 5:
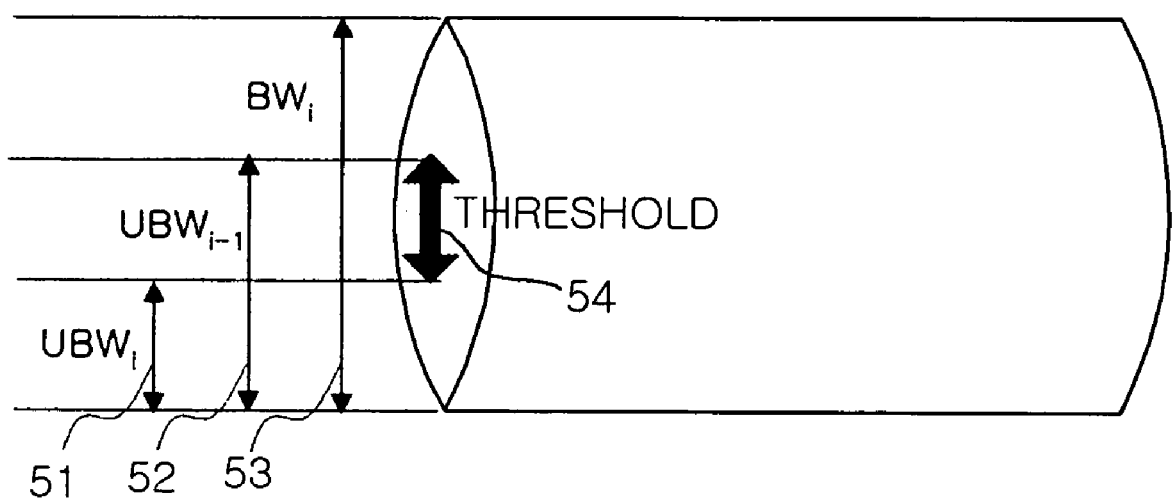
FIG. 5 is a view showing an example of the use of a bandwidth amount state variable according to the present invention.

FIG. 4 is a flowchart of a process of decreasing bandwidth allocated to each path according to the present invention, and FIG. 5 is a view showing an example of the use of a bandwidth amount state variable according to the present invention. Referring to FIGS. 4 and 5, the amount of bandwidth $UBW_i$ 51, currently being used, of the amount of bandwidth additionally allocated at current time $T_i$ is compared to the amount of bandwidth $UBW_{i-1}$ 52 actually used at previous time $T_{i-1}$ at step S402. If a difference between the $UBW_i$ 51 and the $UBW_{i-1}$ 52 is equal to or greater than a preset threshold 54 at step S404, the amount of currently available bandwidth is decreased to the amount of the bandwidth used at the previous time $T_{i-1}$ using a bandwidth reduction algorithm at step S406. That is, if a result value obtained by subtracting the amount of the bandwidth $UBW_{i-1}$ actually used at the previous time $T_{i-1}$ from the amount of the bandwidth $UBW_i$ additionally allocated at the current time $T_i$ is greater than the preset threshold 54 at step S404, the amount of currently available bandwidth $BW_i$ 53 of the corresponding path Pr is decreased to the amount of the bandwidth $UBW_{i-1}$ used at the previous time at step S406. In this case, a condition in which the result value obtained by subtracting the amount of bandwidth $UBW_{i-1}$ actually used at the previous time $T_{i-1}$ from the amount of bandwidth $UBW_i$ additionally allocated at the current time $T_i$ is equal to or greater than the preset threshold 54 indicates that an excessively large amount of bandwidth to be used between the current time $T_i$ and next time $T_{i+1}$ is allocated. Accordingly, the call block probability of another path may be increased. Therefore, the amount of available bandwidth $BW_i$ 53 of the corresponding path is decreased to the amount of previously used bandwidth $UBW_{i-1}$ 52 to improve bandwidth efficiency. The decreased amount of the allocated bandwidth is reported to the bandwidth broker 101 at step S408. In this way, the bandwidth broker 101 can allocate the decreased amount of the allocated bandwidth to another path.

As described above, in the connection admission control method of the present invention, the ingress edge node performs connection admission control within a range of bandwidth allocated to each path from the bandwidth broker, predicts the amount of additional bandwidth required in consideration of the states of calls input to a corresponding path when the ingress edge node exhausts the bandwidth allocated thereto, requests the amount of the additional bandwidth from the bandwidth broker, and performs connection admission control using the bandwidth additionally allocated to the corresponding path from the bandwidth broker. Further, when the ingress edge node does not exhaust the additionally allocated bandwidth within a certain range, the ingress edge node decreases the amount of the additionally allocated bandwidth and returns the decreased amount of the bandwidth to the bandwidth broker. Therefore, dynamic bandwidth allocation can be performed depending on the states of input flows, and the state of the network can be sufficiently taken into consideration, thus enabling resources to be efficiently used through a bandwidth reduction algorithm.

Further, in the connection admission control method of the present invention, the bandwidth broker only performs the management of bandwidths for respective paths, thus simplifying bandwidth management. Further, the ingress edge node performs connection admission control without communicating with the bandwidth broker within the bandwidths allocated to respective paths, thus rapidly performing connection admission control and minimizing the number of communications between respective nodes and the bandwidth broker.

As described above, the present invention provides a method of performing adaptive connection admission control in consideration of the states of input calls in a differentiated services network, which allows an ingress edge node to perform connection admission control without communicating with a bandwidth broker within bandwidths allocated to respective paths, thus rapidly performing connection admission control and minimizing the number of communications between respective nodes and the bandwidth broker.

Further, the present invention is advantageous in that, when the ingress edge node exhausts an initially allocated bandwidth, it predicts additional bandwidth in consideration of the states of calls input to each path, thus performing connection admission control adaptive to the states of the input calls.

Further, the present invention is advantageous in that, when the ingress edge node does not exhaust the additionally allocated bandwidth for each path within a certain range, the ingress edge node decreases the amount of the additionally allocated bandwidth and returns the decreased amount of the bandwidth to the bandwidth broker, so that scalability is increased and complexity is decreased while the efficiency of the use of resources is maximized, thus effectively providing services with high value added, such as QoS guaranteed services and real time services in the Internet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of performing adaptive connection admission control in consideration of input call states in a Differentiated Services (DiffServ) network, the DiffServ network including a bandwidth broker, a plurality of ingress and egress edge nodes and a plurality of core nodes, the method comprising the steps of:
   a) a corresponding ingress edge node performing connection admission control for a new connection within an amount of bandwidth initially allocated to each of paths between the ingress and egress edge nodes;
   b) the corresponding ingress edge node comparing an amount of remaining bandwidth allocated to a specific path Pr with an amount of bandwidth required for a connection setup requesting call input to the corresponding ingress edge node, and calculating an amount of additional bandwidth to be requested from the bandwidth broker when the corresponding ingress edge node determines that the amount of the remaining bandwidth does not satisfy the amount of the bandwidth required for the connection setup requesting call;
   c) the corresponding ingress edge node requesting additional bandwidth from the bandwidth broker on the basis of the calculated amount of the additional bandwidth, changing bandwidth information of the corresponding path Pr, and performing connection admission control, wherein the calculated amount takes into account an average of time intervals at which allocation of additional bandwidth is requested from the bandwidth broker; and
   d) decreasing the amount of additionally allocated bandwidth when the amount of the additionally allocated bandwidth is not exhausted within a certain range, and returning the decreased amount of the additionally allocated bandwidth to the bandwidth broker;
   wherein the step d) comprises the steps of:
   comparing an amount of bandwidth UBWi being used at current time Ti of the amount of the additionally allocated bandwidth with an amount of bandwidth UBWi.1 actually used at previous time Ti–1; and
   decreasing an amount of currently available bandwidth BWi of the corresponding path Pr when a difference between the amount of the bandwidth UBWi and the amount of the bandwidth UBWi.~is equal to or greater than a preset threshold.

2. The adaptive connection admission control method according to claim 1, wherein the amount of the currently available bandwidth BWi of the corresponding path Pr is decreased to the amount of the bandwidth UBWi_1 actually used at the previous time Ti–1.

3. The adaptive connection admission control method according to claim 1, further comprising the step of the bandwidth broker withdrawing the decreased amount of the additionally allocated bandwidth and allocating the decreased amount of the additionally allocated bandwidth to another path.

4. The adaptive connection admission control method according to claim 1, wherein the step a) comprises the steps of:
   determining each of paths between the ingress and egress edge nodes within the DiffServ network using a routing protocol;
   the bandwidth broker determining an amount of initial bandwidth for each path and reporting the determined amount of the initial bandwidth for each path to the ingress edge node;
   selecting the path Pr using a destination address when the call requesting new connection setup is input to the ingress edge node; and
   accepting the connection setup request when the amount of the remaining bandwidth, which is allocated to the selected path Pr and is currently available, is greater than the amount of the bandwidth required for the connection setup requesting call.

5. The adaptive connection admission control method according to claim 1, wherein the step b) is performed so that, when the amount of the remaining bandwidth satisfies the amount of the bandwidth required for the connection setup requesting call, the bandwidth information of the corresponding path Pr is changed as expressed in the following Equation changed bandwidth information of Pr=amount of remaining bandwidth of Pr–amount of bandwidth required for new call.

6. The adaptive connection admission control method according to claim 1, wherein the step c) comprises the steps of:
   the ingress edge node requesting the bandwidth broker to allocate the additional bandwidth predicted depending on the state of the input call;
   the bandwidth broker receiving the request, determining whether to accept the request for the allocation of the additional bandwidth depending on states of links through which the corresponding path Pr passes;
   the ingress edge node receiving a response to the request for the allocation of the additional bandwidth from the bandwidth broker and determining whether allocation of the additional bandwidth succeeds; and
   rejecting the connection setup request if the allocation of the additional bandwidth fails, while changing the bandwidth information of the corresponding path Pr and accepting the connection setup request if the allocation of the additional bandwidth succeeds.

7. The adaptive connection admission control method according to claim 6, wherein the bandwidth information of the corresponding path Pr is changed as expressed in the following equation changed bandwidth information of Pr=(amount of remaining bandwidth of Pr+Mt')–amount of bandwidth required for new call.

* * * * *